US00RE49617E

(19) United States
(12) Reissued Patent
Mizuno

(10) Patent Number: US RE49,617 E
(45) Date of Reissued Patent: Aug. 22, 2023

(54) GAME SERVER, NON-TRANSITORY COMPUTER-READABLE STORAGE MEDIUM, GAME CONTROL METHOD, AND GAME SYSTEM

(71) Applicant: GREE, INC., Tokyo (JP)

(72) Inventor: Shinji Mizuno, Tokyo (JP)

(73) Assignee: GREE, INC., Tokyo (JP)

(21) Appl. No.: 16/375,536

(22) Filed: Apr. 4, 2019

Related U.S. Patent Documents

Reissue of:
(64) Patent No.: 9,694,287
Issued: Jul. 4, 2017
Appl. No.: 15/277,729
Filed: Sep. 27, 2016

U.S. Applications:
(63) Continuation of application No. 14/254,557, filed on Apr. 16, 2014, now Pat. No. 9,480,926.

(30) Foreign Application Priority Data

Apr. 19, 2013 (JP) ..... 2013-088499
Dec. 16, 2013 (JP) ..... 2013-259518

(51) Int. Cl.
*A63F 13/79* (2014.01)
*A63F 13/20* (2014.01)
(Continued)

(52) U.S. Cl.
CPC ..... *A63F 13/79* (2014.09); *A63F 13/20* (2014.09); *A63F 13/335* (2014.09); *A63F 13/35* (2014.09);
(Continued)

(58) Field of Classification Search
CPC ..... A63F 13/79; A63F 13/20; A63F 13/335; A63F 13/35; A63F 13/61; A63F 13/87;
(Continued)

(56) References Cited

U.S. PATENT DOCUMENTS

2007/0225070 A1* 9/2007 Zahorik ..... A63F 13/335 463/29
2009/0197681 A1* 8/2009 Krishnamoorthy .... G06Q 30/02 463/42
(Continued)

FOREIGN PATENT DOCUMENTS

JP 2002-083213 A 3/2002

OTHER PUBLICATIONS

"Final Written Decision Determining All Claims Unpatentable Denying Patent Owner's Motion to Amend 35 U.S.C. Section 328(a)" issued in PGR2018-00060 dated Sep. 26, 2019, Paper 32.
(Continued)

*Primary Examiner* — Jeffrey D Carlson
(74) *Attorney, Agent, or Firm* — Oliff PLC

(57) ABSTRACT

A game server employs a notification system associated with purchase of an item in a game and is capable of promoting the purchase of the item, Specifically, a game server may include a notifier, when receiving a request for provision of a first item from a communication terminal, for sending a notification that the first item is provided to the communication terminal to a communication terminal; and an item provider, when sending the notification from the notifier to the communication terminal that the first item is provided, for providing a second item, in addition to the first item, to at least one of the communication terminal and the communication terminal that sends the request for provision of the first item.

15 Claims, 9 Drawing Sheets

(51) Int. Cl.

| | |
|---|---|
| ***A63F 13/335*** | (2014.01) |
| ***A63F 13/35*** | (2014.01) |
| ***A63F 13/61*** | (2014.01) |
| ***A63F 13/795*** | (2014.01) |
| ***A63F 13/87*** | (2014.01) |

(52) U.S. Cl.
CPC ..... *A63F 13/61* (2014.09); *A63F 13/795* (2014.09); *A63F 13/87* (2014.09); *A63F 2300/575* (2013.01); *A63F 2300/609* (2013.01)

(58) Field of Classification Search
CPC ..... A63F 13/795; A63F 2300/609; A63F 2300/575
See application file for complete search history.

(56) References Cited

U.S. PATENT DOCUMENTS

| | | | | |
|---|---|---|---|---|
| 2011/0124415 | A1* | 5/2011 | Shimono | A63F 13/12 463/42 |
| 2012/0157212 | A1* | 6/2012 | Kane | A63F 13/10 463/42 |
| 2012/0283014 | A1* | 11/2012 | Van Luchene | G07F 17/32 463/31 |
| 2013/0035158 | A1* | 2/2013 | Osvald | A63F 13/655 463/30 |
| 2013/0231182 | A1* | 9/2013 | Hall | A63F 13/12 463/31 |
| 2013/0281202 | A1 | 10/2013 | Trinh et al. | |
| 2013/0303187 | A1* | 11/2013 | Nishina | A63F 13/216 455/456.1 |
| 2014/0004920 | A1* | 1/2014 | Tagawa | A63F 13/533 463/16 |
| 2014/0004955 | A1* | 1/2014 | Nahari | A63F 13/12 463/42 |
| 2014/0067557 | A1 | 3/2014 | van Niekerk et al. | |
| 2014/0128155 | A1* | 5/2014 | Morioka | A63F 13/12 463/29 |

OTHER PUBLICATIONS

Apr. 4, 2019 Petition for Post Grant Review of U.S. Pat. No. 9,694,287.
"Patent Owner's Preliminary Response" filed in PGR2018-00060 dated Jul. 17, 2018.
"Trial Instituted Document" filed in PGR2018-00060 on Sep. 28, 2018.
"Patent Owner's Response" filed in PGR2018-00060 dated Jan. 11, 2019.
"Patent Owner's Contingent Motion to Amend" filed in PGR2018-00060 dated Jan. 11, 2019.
"Petitioner's Reply to Patent Owner's Response" filed in PGR2018-00060 dated Apr. 5, 2019.
"Petitioner's Opposition to Motion to Amend" issued in PGR2018-00060 dated Apr. 5, 2019.
"Patent Owner's Sur-Reply" filed in PGR2018-00060 on May 2, 2019.
"Patent Owner's Reply to Opposition to Motion to Amend" filed in PGR2018-00060 dated May 2, 2019.
"Declaration of Michael Zyda" filed in PGR2018-00060 on Jul. 17, 2018.
Exhibit 1009 (Transcript of Deposition Taken of Michael Zyda) filed in PGR2018-00060 on Mar. 28, 2019.
Jul. 14, 2021 Office Action issued in U.S. Appl. No. 16/916,315.
Nov. 29, 2021 Office Action issued in U.S. Appl. No. 16/916,315.
Apr. 22, 2016 Final Office Action issued in U.S. Appl. No. 14/254,557.

* cited by examiner

FIG. 2

111

| User identification information | User name | Friend user identification information |
|---|---|---|
| U001 | User A | UID002, UID003, UID004 |
| U002 | User B | UID001, UID005, UID006, UID007, UID008 |
| U003 | User C | UID001 |
| ... | ... | ... |

FIG. 3

112

| Notification time | Notification source user identification information | Notification destination user identification information | Information about acquisition by user of notification destination |
|---|---|---|---|
| 2013/2/28 20:12 | UID001 | UID002 | Yes |
| 2013/2/28 20:12 | UID001 | UID003 | No |
| 2013/2/28 20:12 | UID001 | UID004 | No |
| ... | ... | ... | ... |

FIG. 9

113

| Notification source user ID information | Primary notification destination user ID information | Secondary notification destination user ID information | ... |
|---|---|---|---|
| UID001 | UID002 | UID002 | ... |
| UID001 | UID003 | UID003 | ... |
| UID001 | UID004 | UID004 | ... |
| UID001 | UID002 | – | – |
| UID001 | UID003 | – | – |
| ... | ... | ... | ... |

GAME SERVER, NON-TRANSITORY COMPUTER-READABLE STORAGE MEDIUM, GAME CONTROL METHOD, AND GAME SYSTEM

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE TO RELATED APPLICATION

This *is a reissue* application *of U.S. Pat. No. 9,694,287, which was U.S. patent application Ser. No. 15/277,729, filed on Sep. 27, 2016, which* is a continuation of U.S. *patent* application Ser. No. 14/254,557, filed on Apr. 16, 2014, [pending,] which claims priority to and the benefit of Japanese Patent Application No. 2013-088499 filed on Apr. 19, 2013 and Japanese Patent Application No. 2013-259518 filed on Dec. 16, 2013, the entire contents of which are incorporated herein by reference. *U.S. patent application Ser. No. 16/916,315, file on Jun. 30, 2020, is a continuation of the present application and is a reissue application of U.S. Pat. No. 9,694,287.*

TECHNICAL FIELD

The present invention relates to a game server that may promote acquisition of an item, a non-transitory computer-readable storage medium, a game control method, and a control method of a game system.

BACKGROUND ART

Conventionally, there has been an affiliate system as advertisement that uses a network. In the affiliate system, a person introduces a product and the like of a seller by setting a link or the like on a webpage and, when a customer clicks through the link or the like and acquires the product by purchasing it or the like, a predetermined reward is given to the person (for example, PLT1). Especially, since many customers refer an introduction or evaluation made by their acquaintances in determining the purchase, the affiliate system is very useful.

CITATION LIST

Patent Literature

PLT 1: JP 2002-83213

SUMMARY OF INVENTION

Technical Problem

However, the affiliate system described above has been used for the electronic commerce on the Internet alone and not used in a game such as an online game. For example, for an item used in the game, there has been no system of notification, introduction and the like associated with the item through the affiliate, and thus acquisition of the item in the game has not been sufficiently promoted.

Accordingly, an object of the present invention in consideration of the above problem is to provide a game server that employs a notification system associated with acquisition of the item in the game and thus is capable of promoting the acquisition of the item, a non-transitory computer-readable storage medium, a game control method, and a game system,

Solution to Problem

In order to solve the above problem, a game server according to the present invention for providing a plurality of items usable in a game to a plurality of communication terminals, the game server is characterized in including:

an item providing means for providing, when receiving a request for provision of a first item usable in the game from a first communication terminal corresponding to first user ID information, the first item to the first communication terminal; and a notification means, when providing the first item to the first communication terminal, for sending a notification that the first item is provided to the first communication terminal to a second communication terminal corresponding to user ID information linked to the first user ID information, wherein the item providing means provides a second item usable in the game, in addition to the first item, to at least one of the first communication terminal that is mentioned in the notification that the first item is provided to the first communication terminal sent to the second communication terminal by the notification means and the second communication terminal that sends the request for provision of the first item based on the notification.

The game server according to the present invention is characterized in that a user corresponding to the second communication terminal is a friend user of a user corresponding to the first communication terminal.

The game server according to the present invention is characterized in that the second item is identical to the first item.

The game server according to the present invention is characterized in that the first item and the second item restore an energy, an attack cost and a defense cost.

The game server according to the present invention is characterized in that the notification means sends, to the second communication terminals corresponding to a plurality of second user ID information, the notification that the first item is provided, and the item providing means, when receiving the request for provision of the first item from a predetermined number of second communication terminals, further provides the second item to the first communication terminal.

The game server according to the present invention is characterized in that the item providing means, when a total number of notifications is no less than a predetermined number, provides the second item to communication terminals corresponding to user ID information associated with the notifications.

The game server according to the present invention is characterized in further including a selection panel generation means for generating a selection panel that allows for selection of, among a plurality of different user ID information linked to the first user ID information, a destination of the notification that the first item is provided to the first communication terminal.

A non-transitory computer-readable storage medium according to the present invention for storing an order to be executed by a computer for functioning as a game server for providing a plurality of items usable in a game to a plurality of communication terminals, the non-transitory computer-readable storage medium is characterized in that the order includes a program for executing:

an item providing step of providing, when receiving a request for provision of a first item usable in the game from a first communication terminal corresponding to first user ID information, the first item to the first communication terminal; and a notification step of sending, when providing the first item to the first communication terminal, a notification that the first item is provided to the first communication terminal to a second communication terminal corresponding to user ID information linked to the first user ID information, wherein at the item providing step, a second item usable in the game, in addition to the first item, is provided to at least one of the first communication terminal that is mentioned in the notification that the first item is provided to the first communication terminal sent to the second communication terminal at the notification step and the second communication terminal that sends the request for provision of the first item based on the notification.

The non-transitory computer-readable storage medium according to the present invention is characterized in that a user corresponding to the second communication terminal is a friend user of a user corresponding to the first communication terminal.

The non-transitory computer-readable storage medium according to the present invention is characterized in that the second item is identical to the first item.

The non-transitory computer-readable storage medium according to the present invention is characterized in that the first item and the second item restore an energy, an attack cost and a defense cost.

The non-transitory computer-readable storage medium according to the present invention is characterized in that, at the notification step, the notification that the first item is provided is sent to second communication terminals corresponding to a plurality of second user ID information, and at the item providing step, when receiving a request for provision of the first item from a predetermined number of second communication terminals, the second item is further provided to the first communication terminal.

The non-transitory computer-readable storage medium according to the present invention is characterized in that, at the item providing step, when a total number of notifications is no less than a predetermined number, the second item is provided to communication terminals corresponding to user ID information associated with the notifications.

The non-transitory computer-readable storage medium according to the present invention is characterized in causing execution of a selection panel generation step of generating a selection panel that allows for selection of, among a plurality of different user ID information linked to the first user ID information, a destination of the notification that the first item is provided to the first communication terminal.

A game control method according to the present invention is a control method of a game server for providing a plurality of items usable in a game to a plurality of communication terminals, the game control method is characterized in including:

an item providing step of providing, when receiving a request for provision of a first item usable in the game from a first communication terminal corresponding to first user ID information, the first item to the first communication terminal; and a notification step of sending, when providing the first item to the first communication terminal, a notification that the first item is provided to the first communication terminal to a second communication terminal corresponding to user ID information linked to the first user ID information, wherein at the item providing step, a second item usable in the game, in addition to the first item, is provided to at least one of the first communication terminal that is mentioned in the notification that the first item is provided to the first communication terminal sent to the second communication terminal at the notification step and the second communication terminal that sends the request for provision of the first item based on the notification.

The game control method according to the present invention is characterized in that a user corresponding to the second communication terminal is a friend user of a user corresponding to the first communication terminal.

The game control method according to the present invention is characterized in that the second item is identical to the first item.

A game system according to the present invention having a plurality of communication terminals and a game server for providing a plurality of items usable in a game to the plurality of communication terminals, the game system is characterized in that when the game server receives a request for provision of a first item usable in the game from a first communication terminal corresponding to first user ID information, the first item is provided to the first communication terminal, when providing the first item to the first communication terminal, a notification that the first item is provided to the first communication terminal is sent to a second communication terminal corresponding to user ID information linked to the first user ID information, and a second item usable in the game, in addition to the first item, is provided to at least one of the first communication terminal that is mentioned in the notification that the first item is provided to the first communication terminal sent to the second communication terminal and the second communication terminal that sends the request for provision of the first item based on the notification.

Advantageous Effect of the Invention

According to the game server, the non-transitory computer-readable storage medium, the game control method, and the game system of the present invention, a system for notifying about acquisition of the item may be incorporated in the game, thereby promoting acquisition of the item in the game.

BRIEF DESCRIPTION OF DRAWINGS

FIG. 2 is an example of user information according to one embodiment of the present invention.

FIG. 3 is an example of notification history information according to one embodiment of the present invention.

FIG. 9 is an example of notification path information according to the exemplary variation of the present invention.

DESCRIPTION OF EMBODIMENT

An embodiment of the present invention will be described hereinafter,

Embodiment

Figure 1:
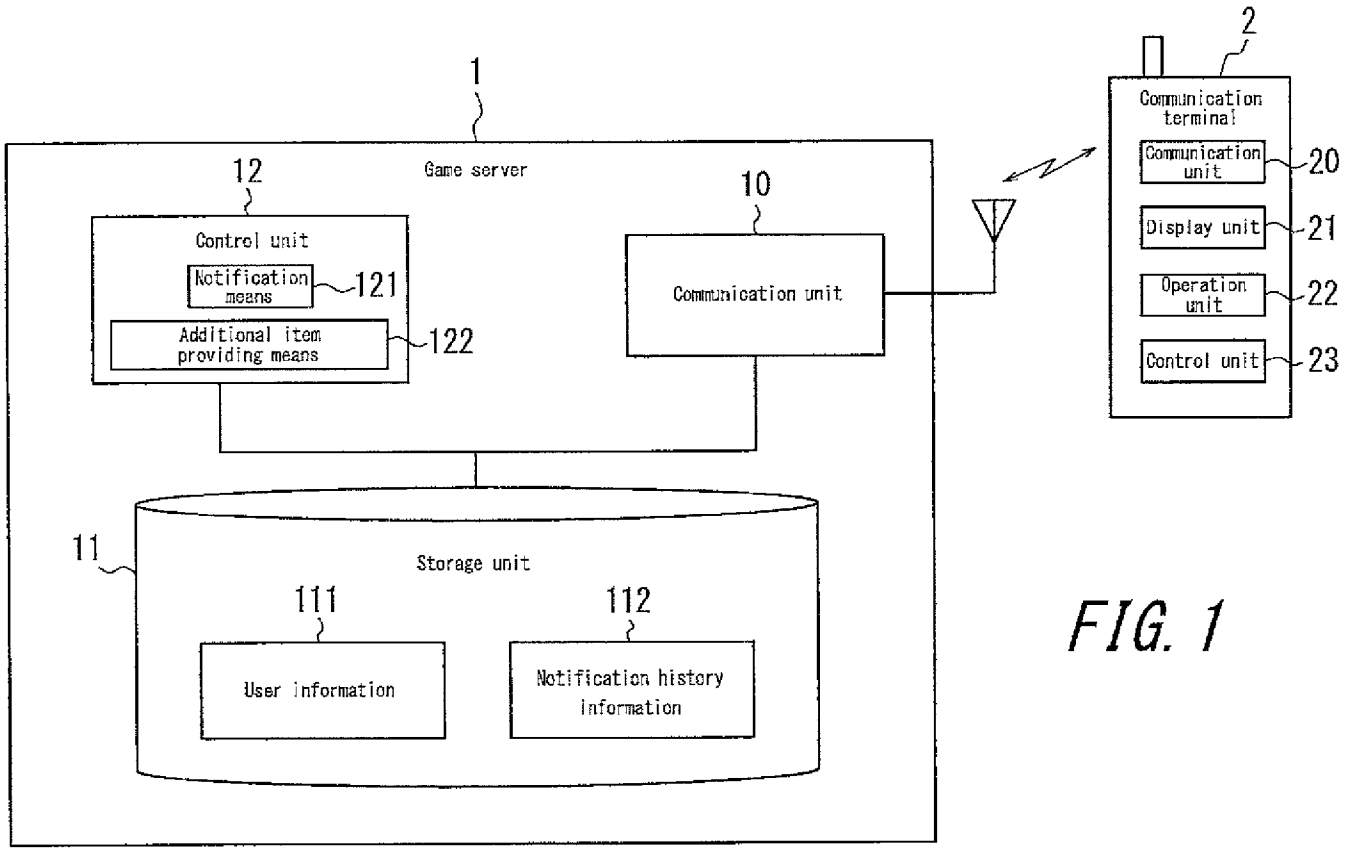
FIG. 1 is a block diagram of a game system according to one embodiment of the present invention.

FIG. 1 is a block diagram of a game system according to one embodiment of the present invention. The game system according to the embodiment of the present invention includes a game server 1 and a plurality of communication terminals 2. Note that, for simplification, only one of the communication terminals 2 is illustrated in FIG. 1.

The game server 1 includes a communication unit 10, a storage unit 11, and a control unit 12. The game server 1 provides a predetermined game to a plurality of communication terminals 2. Also, the game server 1, based on a purchase request from the communication terminal 2, provides a variety of items usable in a game to a user.

The communication unit 10 communicates with a plurality of communication terminals 2 either wirelessly or by using a wire.

The storage unit 11 stores various information necessary for the game system. In particular, the storage unit 11 stores user information 111 and notification history information 112.

The user information 111 includes information associated with a name and a friend user of each user. The friend user is another user with whom the user mutually resisters as a friend in the game. FIG. 2 illustrates an example of the user information 111. The user information 111 illustrated in FIG. 2 includes, for example, user ID information "UID001", a user name "user A", and friend user ID information "UID002 UID003, UID004". Here, the user ID information means identification information for uniquely identifying the user in the system. Also, the friend user ID information means user ID information associated with the friend user. That is, by the user information 111, one user ID information is linked to another user ID information. According to the present invention, in summary, when a user (a user of first user ID information) acquires an item (a first item), a notification (hereinafter, referred to as item providing information) that the item is provided to the communication terminal 2 associated with the user of the first user ID information is sent to a friend user (a user of second user ID information). Hereinafter, a communication terminal of the user of the first user ID information is referred to as a communication terminal 2-1 (a first communication terminal), and a communication terminal of the user of the second user ID information is referred to as a communication terminal 2-2 (a second communication terminal).

The notification history information 112 contains a notification history associated with acquisition of the item. FIG. 3 illustrates an example of the notification history information 112. The notification history information 112 contains a notification time, notification source user ID information, notification destination user ID information, and information about acquisition by a user of a notification destination. The information about acquisition by the user of the notification destination means information about whether the user of the notification destination, after receiving the notification, acquires a predetermined item of the notification. In this information, "Yes" means that the user of the notification destination has acquired the item, while "No" means otherwise. Note that the predetermined item of the notification means the item acquired by a user of a notification source (i.e., the first item), For example, the notification history information 112 illustrated in FIG. 3 contains "20:12 on Feb. 28, 2013" as the notification time, "UID001" as the notification source user ID information, "UID002" as the notification destination user ID information, and "Yes" as the information about acquisition by the user of the notification destination. This means that a notification is sent at 20:12 on Feb. 28, 2013 from the user associated with "UID001" to the user associated with "UID002", who has acquired the item later.

The control unit 12 includes a notification means 121 and an additional item providing means 122 and carries out various controls of the game server 1. For example, the control unit 12, when receiving a request for provision of an item (hereinafter, referred to as a providing request) from the communication unit 2-1, refers to the user information 111 in the storage unit 11 and retrieves user ID information (second user ID information) linked to user ID information (first user ID information) of the user who has sent the request for provision of the item. That is, the control unit 12 retrieves at least one friend user ID information of the user information 111 as the second user ID information. Preferably, the request for provision of the item includes the user ID information, and the control unit 12 determines the user ID information based on the request for provision of the item.

The notification means 121, based on the second user ID information retrieved by the control unit 12, inquires of the communication terminal 2-1 for a notification destination of the item providing information. In particular, the notification means 121 sends information about a panel that allows for selection of the notification destination (hereinafter, referred to as a notification destination selection panel) to the communication terminal 2-1. Also, the notification means 121, based on the second user ID information selected as the notification destination obtained from the communication terminal 2-1, sends the item providing information to the communication terminal 2-2, When the notification means 121 sends the item providing information, the control unit 12 records the notification time, the notification source user ID information (first user ID information), and the notification destination user ID information (second user ID information) as the notification history information 112 of the storage unit 11.

The additional item providing means 122, when the notification means 121 sends the notification described above, provides an additional item (a second item) to the communication terminal 2-1. The additional item is provided to the user in addition to the item of the providing request. Preferably, the additional item is identical to the item of the providing request, Accordingly, the user of the notification source, when the notification means 121 sends the notification, may acquire the item in response to the request for provision of the item, as well as another item as a bonus that is identical to the item of the providing request.

The additional item providing means 122, when receiving the request for provision of the item from the communication terminal 2-2, provides the additional item to the communication terminal 2-2. Preferably, the additional item is identical to the item of the providing request. That is, the friend user as the notification destination may acquire the item in response to the request for provision of the item and, further, another item as a bonus that is identical to the item of the providing request. When the additional item providing means 122 provides the additional item to the communication terminal 2-2, the control unit 12 changes information on acquisition of the notification destination of the notification history information 112 in the storage unit 11 from "No" to "Yes".

The additional item providing means 122, further, periodically refers to the notification history information 112. When at least a predetermined number of communication terminals 2-2 among the communication terminals 2-2 of the notification destinations having the first user ID information as the notification source acquire the item, the additional item providing means 122 provides another additional item to the communication terminal 2-1. In particular, the additional item providing means 122 provides another additional item to the communication terminal 2-1 when at least a predetermined number of information on acquisition of the notification destination having the first user ID information as the notification source in the notification history information 112 indicate "Yes".

Figure 4:
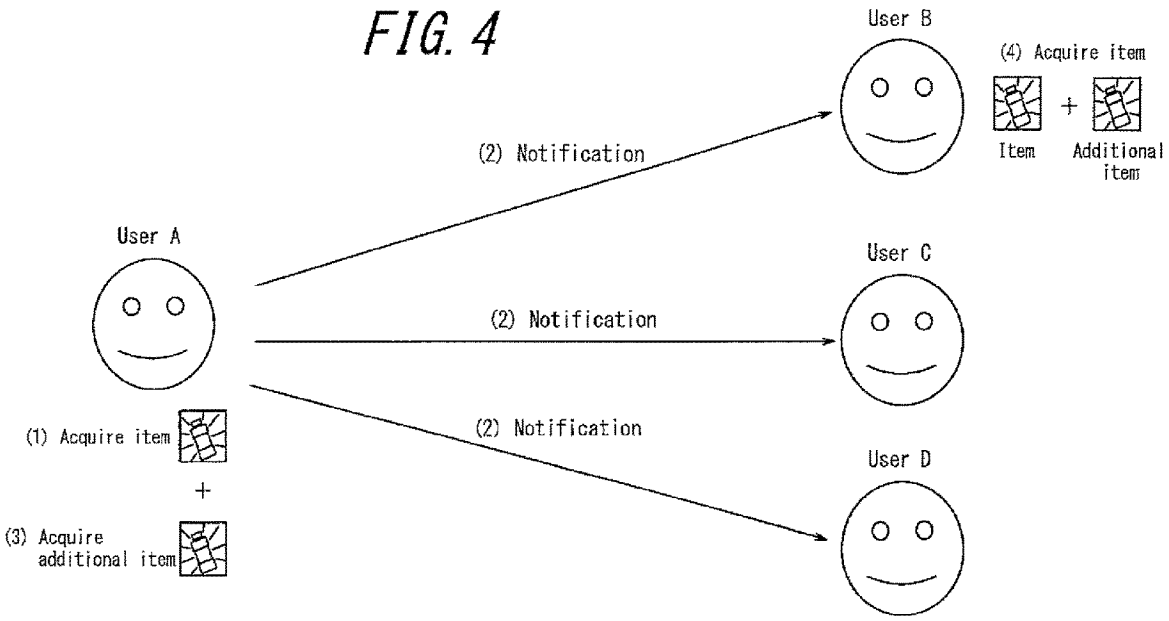
FIG. 4 is a conceptual diagram associated with notification and provision of an additional item according to one embodiment of the present invention.

FIG. 4 illustrates a conceptual diagram associated with the notification and the provision of the additional item according to the present embodiment. A user A is a user who first sends the request for provision of the item, When the user A sends the request for provision of the item ((1) of FIG. 4), the game server 1, based on selection of the notification destination made by the user A, sends item acquisition notification to users B, C, and D ((2) of FIG. 4), who are the user A's friend users. Upon this notification, the game server 1 provides the additional item, as a bonus in addition to the item of the providing request, to the user A ((3) of FIG. 4). Further, when, for example, the user B receiving the notification acquires the item, the game server 1 provides the additional item as a bonus in addition to the item of the providing request to the user B ((4) of FIG. 4). Note that, although FIG. 4 illustrates an example where the user B alone among the notification destinations acquires the item, the game server 1, also when the user C or the user D acquires the item, provides an additional item as a bonus in addition to the item of the providing request to the user C or the user D.

The communication terminal 2 includes a communication unit 20, a display unit 21, an operation unit 22, and a control unit 23.

The communication unit 20, by using at least one of a wireless method and a wired method, communicates with the game server 1. In particular, the communication unit 20, based on an operation of the operation unit 22 by the user, sends the request for provision of the item to the game server 1. Also, the communication unit 20 receives the item of the providing request from the game server 1.

The display unit 21 includes an LCD display, an organic EL display or the like and outputs a display associated with a game provided from the game server 1. The display unit 21 displays, for example, a panel associated with acquisition of the item and an image of the item provided from the game server 1.

FIG. 5 illustrates examples of the panel displayed by the display unit 21. FIG. 5(a) illustrates an item acquisition panel for sending the request for provision of the item. An area 501 of the item acquisition panel displays an item to be acquired and a description thereof such as, for example, "Drink A: a special drink for restoring all an energy, an attack cost and a defense cost!". A button 502 may be either clicked or touched and, in response thereto, the communication terminal 2 sends the request for provision of the item to the game server 1.

Figure 5A:
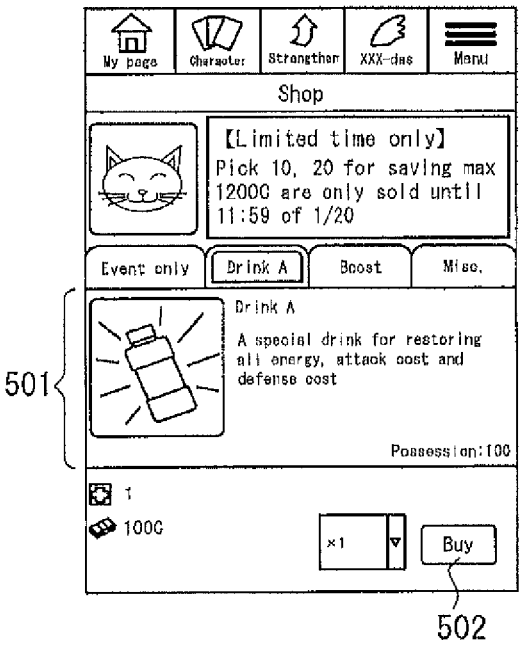
FIGS. 5(a) to 5(d) are examples of panels displayed on a communication terminal according to one embodiment of the present invention.
Figure 5B:
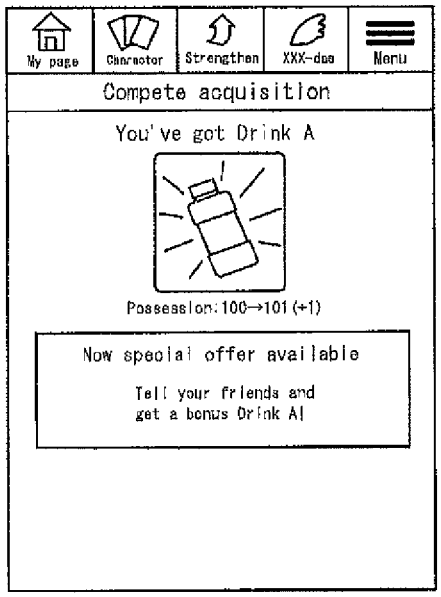
Figure 5C:
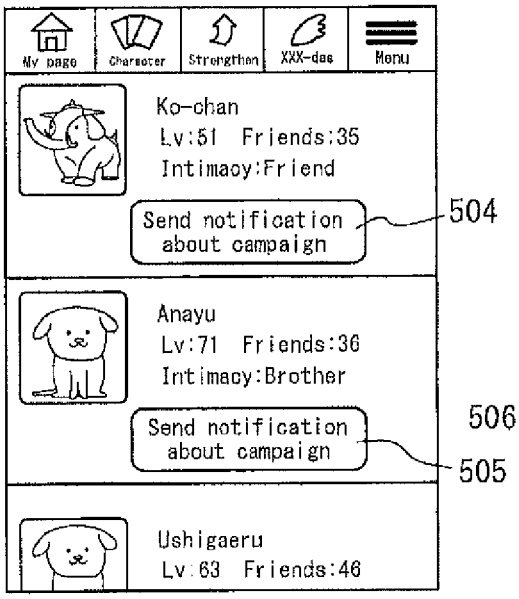
Figure 5D:
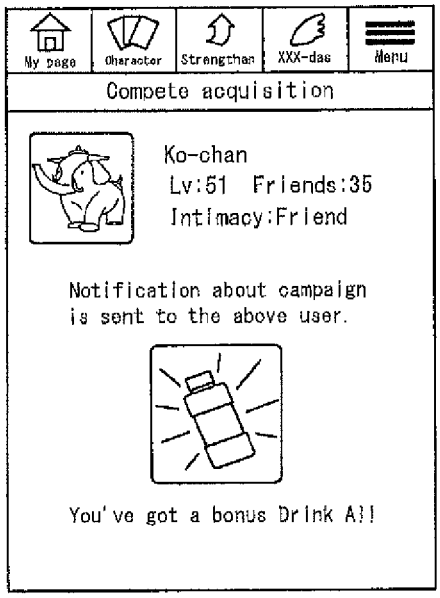

When the button 502 is clicked and the like in FIG. 5(a), the display unit 21 displays an item providing panel illustrated in FIG. 5(b). The item providing panel displays information about the acquired item such as "Drink A is acquired". Further, the item providing panel shows that an additional item may be acquired by sending the item providing information. In particular, as illustrated in an area 503, a message such as "Now special offer available/Tell your friends and get another Drink A!" is displayed. After the panel in FIG. 5(b), the display is shifted to the notification destination selection panel illustrated in FIG. 5(c). The notification destination selection panel allows for selection of the notification destination of the item providing information. On the notification destination selection panel, buttons 504, 505 that allow for selection of the friend users of the notification destinations are displayed, When the user clicks or the like those buttons, the user of the notification destination is selected. After selection of the notification destination on the notification destination selection panel of FIG. 5(c), the display is shifted to an additional item provision confirmation panel of FIG. 5(d). The additional item provision confirmation panel shows that the item providing information is sent and the additional item is provided. In particular, as illustrated by the additional item provision confirmation panel in an area 506, a message such as "Notification about the campaign is sent to the above user/You've got another Drink A!!" is displayed.

Figure 6A:
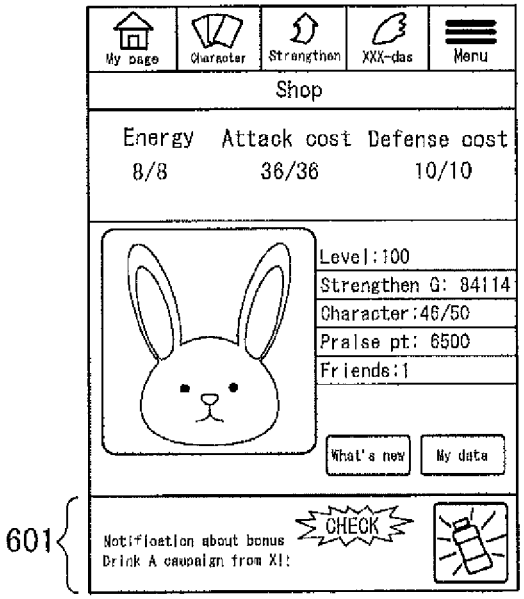
FIGS. 6(a) to 6(c) are examples of panels displayed on the communication terminal receiving a notification according to one embodiment of the present invention.
Figure 6B:
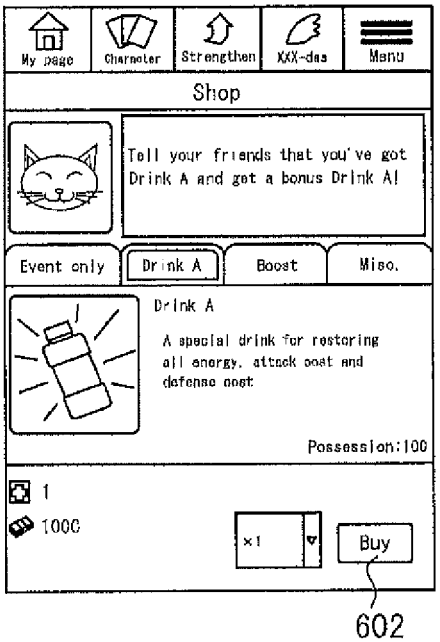
Figure 6C:
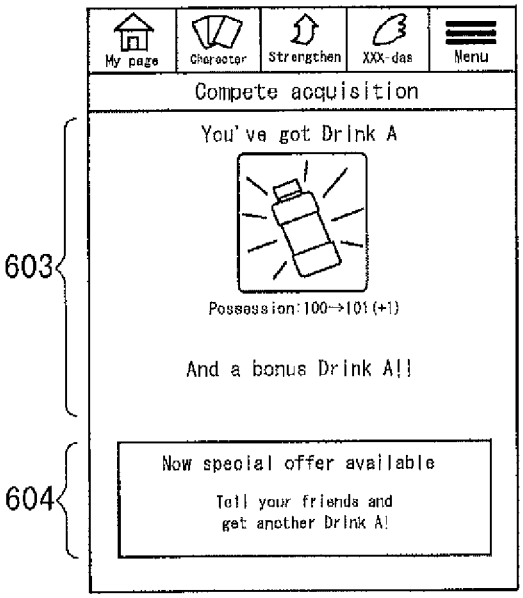

FIG. 6 illustrates examples of a panel displayed by the display unit 21 of the communication terminal 2 of the friend user receiving the notification. FIG. 6(a) illustrates a top page (My page) of the game of each user in the game. When the communication terminal 2 receives the notification about the item providing information, the item providing information of the user of the notification source is displayed on the My page. An area 601 of the My page illustrated in FIG. 6(a) displays a message such as "Notification from X about bonus Drink A campaign!!". When the user goes to the item acquisition panel through a menu button or the like on the My page, the item acquisition panel illustrated in FIG. 6(b) is displayed. The panel in FIG. 6(b) is similar to that in FIG. 5(a). A button 602 may be clicked or the like and, in response thereto, the communication terminal 2 sends the request for provision of the item to the game server 1. After sending the request for provision of the item, the display shifts to the item providing panel illustrated in FIG. 6(c) indicating that the additional item in addition to the item are provided. In particular, as illustrated in an area 603 of the item providing panel, a message such as "You've got Drink A/And a bonus Drink A!!" is displayed. Preferably, the friend user may further send the notification to another friend user of the friend user. In this case, when the friend user sends the notification to another friend user of the friend user, the game server 1 provides a further additional item to the communication terminal 2 of the friend user of the notification source. FIG. 6(c) illustrates an item providing panel that allows the friend user to send the notification to his/her friend user and includes an area 604 displaying the message such as "Now special offer available/Tell your friends and get another Drink A!". In this case, the display shifts from the item providing panel of FIG. 6(c) to the notification selection panel illustrated FIG. 5(c) and then to the additional item providing panel illustrated in FIG. 5(d).

The operation unit 22 includes a button, a touch panel and the like and receives an input signal from the user in the game. Then, the operation unit 22 transmits the input signal received from the user to the control unit 23.

The control unit 23 carries out various controls of the communication terminal 2. For example, the control unit 23, based on an operation of the operation unit 22 by the user, transmits the request for provision of the item and the notification destination user ID information to the game server 1 via the communication unit 20.

Figure 7:
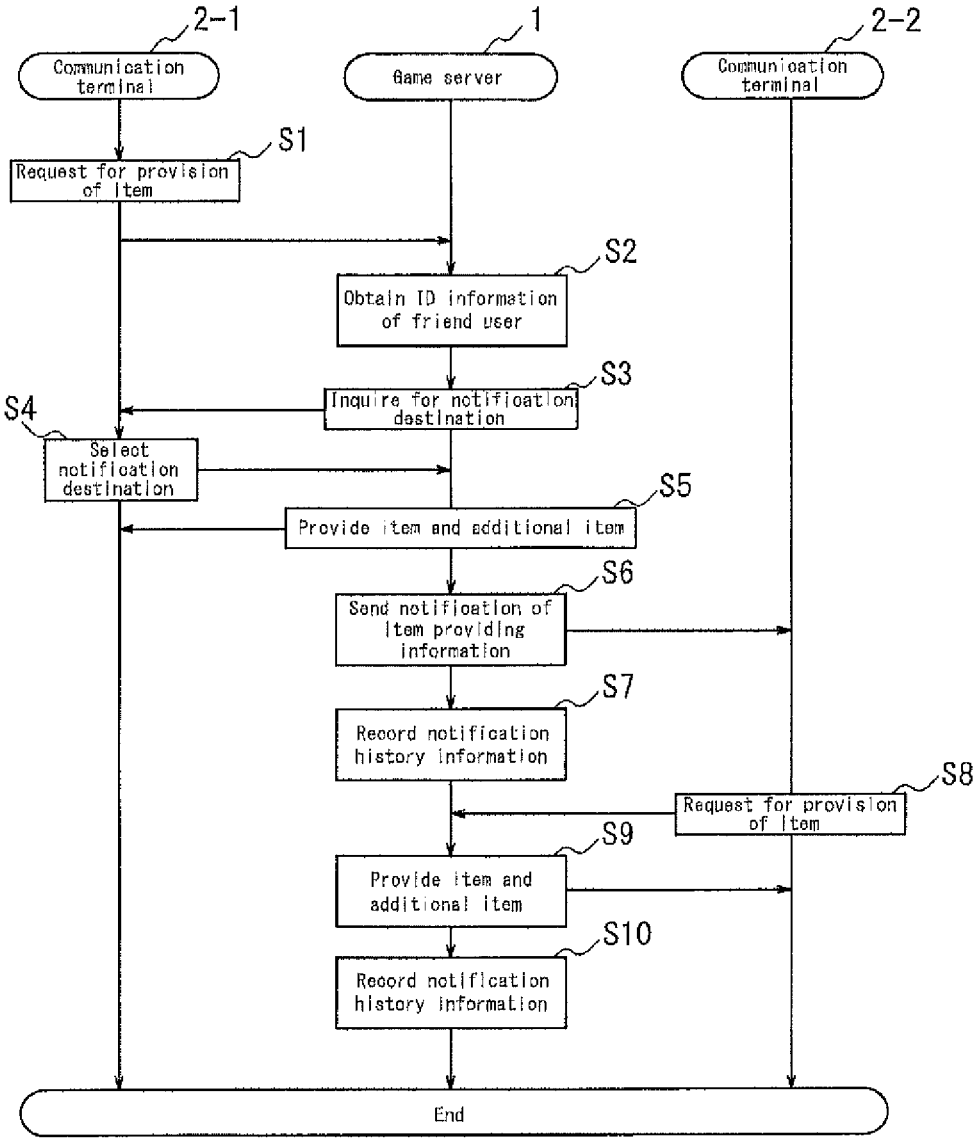
FIG. 7 is a flowchart illustrating an operation of the game system according to one embodiment of the present invention.

Next, an operation of the game system according to the present invention will be described with reference to a flowchart illustrated in FIG. 7. FIG. 7 illustrates an example of the operation taken place when the communication terminal 2-2 receiving the notification further sends the request for provision of the item.

First, the control unit 23 of the communication terminal 2-1, based on the operation of the operation unit 22 by the user, sends the request for provision of the item to the game server 1 (step S1). In particular, the control unit 23, based on the operation by the user on the item acquisition panel displayed on the display unit 21, sends the request for provision of the item to the game server 1. Note that the request for provision of the item includes the first user ID information.

Next, the control unit 12 of the game server 1 refers to the user information 111 in the storage unit 11 and retrieves the second user ID information linked to the first user ID information (step S2).

Subsequently, the notification means 121, based on the second user ID information retrieved by the control unit 12, inquires of the communication terminal 201 for the notification destination (step S3). In particular, the notification means 121 transmits information about the notification destination selection panel.

Then, the display unit 21 of the communication terminal 2-1 displays the item providing panel and also the notification destination selection panel. The control unit 23, based on the selection of the notification destination made by the user, transmits selected second user ID information to the game server 1 (step S4).

Next, to the communication terminal 2-1, the control unit 12 of the game server 1 provides the item and, also, the additional item providing means 122 provides the additional item (step S5).

Subsequently, the notification means 121 of the game server 1, based on the second user ID information selected by the communication terminal 2-1, sends the item providing information to the communication terminal 2-2 (step S6), The control unit 12 records the notification time, the notification source user ID information (first user ID information), and the notification destination user ID information (second user ID information) as the notification history information 112 of the storage unit 11 (step S7).

Then, the control unit 23 of the communication terminal 2-2, based on the operation of the operation unit 22 by the user, sends the request for provision of the item to the game server 1 (step S8). In particular, the control unit 23, based on the operation by the user on the item acquisition panel displayed on the display unit 21 of the communication terminal 2-2, sends the request for provision of the item to the game server 1.

The control unit 12 of the game server 1, when receiving the request for provision of the item from the communication terminal 2-2, provides the item to the communication terminal 2-2 and, further, the additional item providing means 122 provides the additional item to the communication terminal 2-2 (step S9). The display unit 21 of the communication terminal 2-2 displays the item providing panel. Then, the control unit 12 changes the information on acquisition of the notification destination of the notification history information 112 in the storage unit 11 from "No" to "Yes" (step S10). Thus the operation ends.

According to the present invention, as described above, since the notification means 121 of the game server 1 sends the item providing information of a user to another user, a notification system of acquisition of an item is employed in a game, thereby promoting acquisition of the item. According to the present invention, also, since the user of the notification source receives the additional item from the game server 1 in reward for the notification, sending the notification may be promoted. According to the present invention, further, since the additional item providing means 122 provides the additional item also when the user of the notification destination acquires the item, the user may be further encouraged to acquire the item in the game.

Note that the additional item providing means 122 of the game server 1, when a total number of notifications reaches a predetermined number (for example, 10,000 notifications) based on the notification history information 112, may provide another additional item to the users associated with the notification (the user of the notification source user ID information and the user of the notification destination user ID information).

Note that, when the item providing information of users of different notification sources is sent to the same user, the game server 1 records the earliest notification source user ID information alone as the notification history information 112. By prioritizing the user who notifies first as described above, the user may be further encouraged to send the notification of the item providing information.

Although at step S4 the control unit 23 of the communication terminal 23 selects the notification destination based on the operation of the operation unit 22 by the user, selection of whether to notify all of the friend users may be made by an operation of the operation unit 22 by the user. In this case, the additional item providing means 122 of the game server 1, only when the user may be notified at step S4, provides the additional item to the communication terminal 2-1 at step S5. That is, when the user may not be notified, the control unit 12 provides the item at step S5 and the additional item is not provided.

Although at step S3 the notification means 121 of the game server 1 inquires of the communication terminal 2-1 for the notification destination, the present invention is not limited thereto. At step S3, the notification means 121 of the game server 1 may automatically sends the item providing information to the communication terminal 2-2 associated with the second user ID information, without inquiring of the communication terminal 2-1 for the notification destination.

Exemplary Variation

Next, an exemplary variation of the present invention will be described. The storage unit 11 of the game server 1 according to the variation of the embodiment stores notification path information 113. The notification path information 113, when the notification is sent from a user to another user and then further to still another user, includes the user ID information of all of these users. The additional item providing means 122, based on the notification path information 113, provides the additional item to the users on a notification path.

Figure 8:
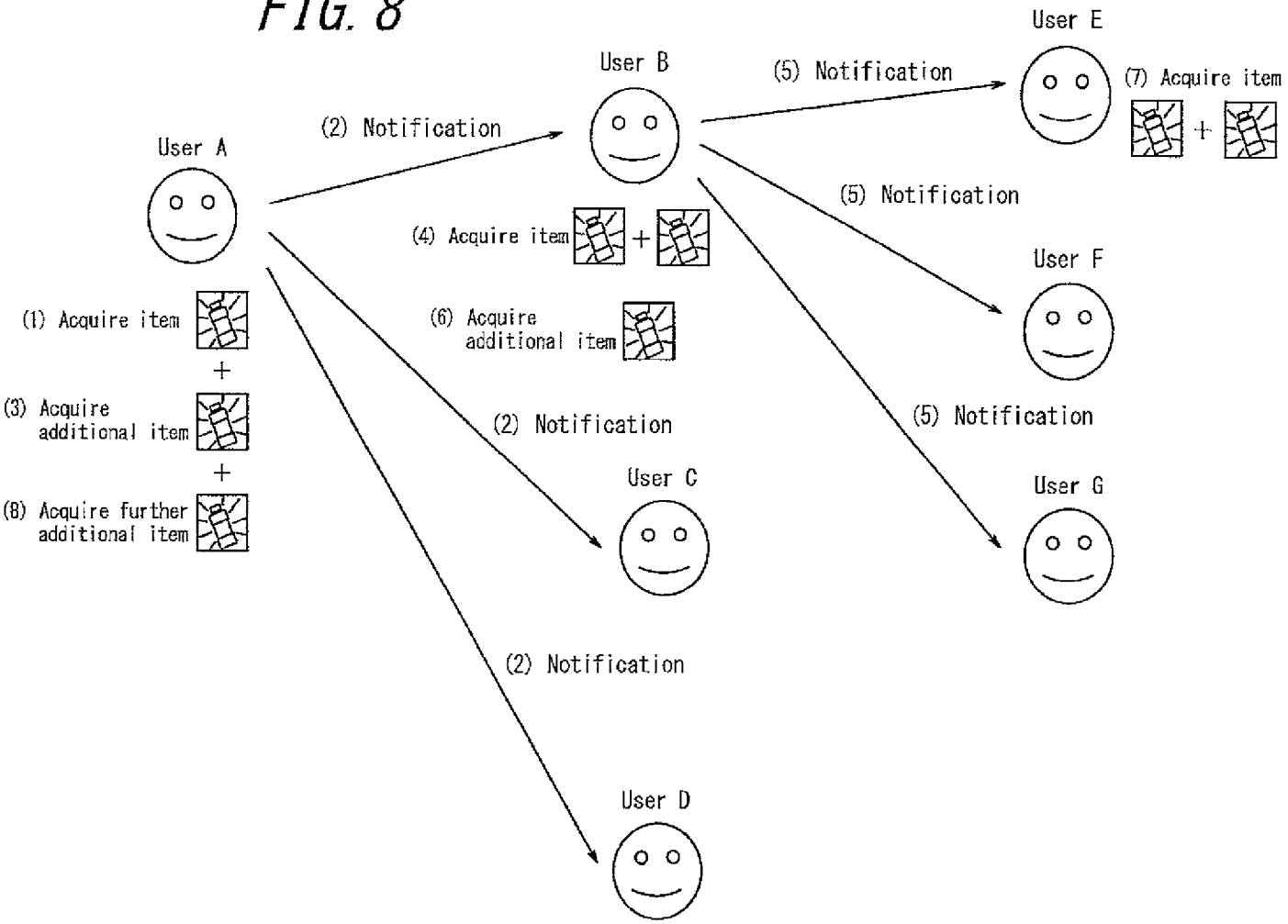
FIG. 8 is a conceptual diagram associated with the notification and the provision of the additional item according to an exemplary variation of the present invention.

FIG. 8 illustrates a conceptual diagram associated with notification of the item providing information and provision of the additional item according to the exemplary variation. The user A is a user who first sends the request for provision of the item. When the user A sends the request for provision of the item ((1) of FIG. 8), the game server 1 sends the item providing information to the users B, C, and D, who are the user A's friend users ((2) of FIG. 8). At this time, the user A acquires the additional item ((3) of FIG. 8). Then, when the user B acquires the items ((4) of FIG. 8), the game server 1 sends the item providing information to users E, F and G who are the user B's friend users ((5) of FIG. 8). At this time, the user B acquires the additional item ((6) of FIG. 8). Further, when the user E acquires the item ((7) of FIG. 8), the game server 1 provides the additional item to the user E ((7) of FIG. 8) and, also, to the user A, who is a source of the notification path of this notification ((8) of FIG. 8). Note that the additional item may be provided not only to the user of the source of the notification path but also to any user on the notification path who contributes to the notification.

FIG. 9 illustrates a concrete example of the notification path information 113. The notification path information 133 includes information associated with the notification source user ID information, primary notification destination user ID information, and secondary notification destination user ID information. Although omitted in FIG. 9, user ID information of notification destinations after the secondary notification destination may be included in a similar manner. Here, the notification source user ID information means the user ID information of the user who first sends the request for provision of the item. The primary notification destination user ID information is the user ID information of the user who receives the notification from the user of the notification source user ID information, The secondary notification destination user ID information is the user ID information of the user who receives the notification from the user of the user ID information of the primary notification destination. The control unit 12 of the game server 1 according to the exemplary variation, when the notification is sent, updates the notification path information 113. Also, the control unit 12, when receiving the request for provision of the item, refers to the notification path information 113 and determines the notification path of the user ID information associated with the request for provision of the item. Then, the control unit 12 provides the additional item to the communication terminal 2 of the user ID information on the notification path.

Here, a computer may be preferably used to function as the communication terminal 2. Such a computer may be substantialized by storing, in a storage unit thereof, a program of an operation for implementing each function of the communication terminal 2 and operating a central processing unit (CPU) of the computer to retrieve and execute the program.

Although the present invention has been described based on the figures and the embodiments, it is to be understood that various alterations and modifications may be implemented based on the present disclosure by those who are ordinarily skilled in the art. Accordingly, such alterations and modifications are included in a scope of the present invention. For example, functions and the like included in each of the means, steps and the like may be rearranged without logical inconsistency, so as to combine a plurality of means or steps together or to divide them.

REFERENCE SIGNS LIST

1 Game server
10 Communication unit
11 Storage unit
12 Control unit
111 User information
112 Notification history information
113 Notification path information
121 Notification means
122 Additional item providing means
2, 2-1, 2-2 Communication terminal
20 Communication unit
21 Display unit
22 Operation unit
23 Control unit
501, 503, 506, 601, 603, 604 Area
502, 504, 505, 602 Button

What is claimed is:

[1. A game server for transmitting a plurality of items usable in a game to a plurality of communication terminals connected to the game server over a network, the game server comprising:

a processor;

a storage unit, executed by the processor, that stores first user ID information and notification information;

an item provider that, when receiving a request for provision of a first item usable in the game from a first communication terminal of the plurality of communication terminals corresponding to first user ID information, provides the first item to the first communication terminal; and a notifier that, when providing the first item to the first communication terminal, sends a notification to a second communication terminal of the plurality of communication terminals that the first item is provided to the first communication terminal, the second communication terminal corresponding to second user ID information linked to the first user ID information, wherein when receiving a request for provision of the first item from the second communication terminal based on the notification, the notifier sends a notification to a third communication terminal of the plurality of communication terminals that the first item is provided to the second communication terminal, the third communication terminal corresponding to third user ID information linked to the second user ID information, wherein the first user ID information identifies a first user, the second user ID information identifies a second user different from the first user, and the third user ID information identifies a third user different from the first user and the second user, and wherein the item provider provides a second item usable in the game, in addition to the first item, to the second communication terminal that is mentioned in the notification sent to the third communication terminal by the notifier.]

[2. The game server according to claim 1, wherein when receiving a request for provision of the first item from the third communication terminal based on the notification, the item provider provides the second item usable in the game to at least one of (i) the first communication terminal and (ii) the third communication terminal that sends a request for provision of the first item based on the notification.]

[3. The game server according to claim 1, wherein a user corresponding to the second communication terminal is a friend user of a user corresponding to the first communication terminal.]

[4. The game server according to claim 1, wherein the second item is identical to the first item.]

[5. The game server according to claim 1, wherein the first item and the second item restore an energy, an attack cost and a defense cost.]

[6. The game server according to claim 1, wherein the notifier sends, to additional communication terminals of the plurality of communication terminals corresponding to a plurality of the additional user ID information, the notification that the first item is provided, and wherein the item provider, when receiving additional requests for the first item from a predetermined number of the additional communication terminals, further provides the second item to the first communication terminal.]

[7. The game server according to claim 1, wherein when the notifier sends the notification to a predetermined number of the plurality of communication terminals, the item provider provides the second item to the plurality of communication terminals corresponding to a plurality of user ID information associated with the notification.]

[8. The game server according to claim 1, further comprising a selection panel generator that generates a selection panel that allows for selection of among a plurality of different user ID information linked to the first user ID information, a destination of the notification that the first item is provided to the first communication terminal.]

[9. A non-transitory computer-readable storage medium for storing an order to be executed by a computer for functioning as a game server for transmitting a plurality of items usable in a game to a plurality of communication terminals connected to the game server over a network, wherein the order includes a program for executing:

an item providing step of, when receiving a request for provision of a first item usable in the game from a first communication terminal of the plurality of communication terminals corresponding to first user ID information, providing the first item to the first communication terminal; and a notification step of, when providing the first item to the first communication terminal, sending a notification to a second communication terminal of the plurality of communication terminals that the first item is provided to the first communication terminal, the second communication terminal corresponding to second user ID information linked to the first user ID information, wherein when receiving a request for provision of the first item from the second communication terminal based on the notification, a notification is sent to a third communication terminal of the plurality of communication terminals that the first item is provided to the second communication terminal, the third communication terminal corresponding to third user ID information linked to the second user ID information, wherein the first user ID information identifies a first user, the second user ID information identifies a second user different from the first user, and the third user ID information identifies a third user different from the first user and the second user, and wherein at the item providing step, a second item usable in the game, in addition to the first item, is provided to the second communication terminal that is mentioned in the notification sent to the third communication terminal by the notifier.]

[10. The non-transitory computer-readable storage medium according to claim 9, wherein when receiving a request for provision of the first item from the third communication terminal based on the notification, the item provider provides the second item usable in the game to at least one of (i) the first communication terminal and (ii) the third communication terminal that sends a request for provision of the first item based on the notification.]

[11. The non-transitory computer-readable storage medium according to claim 9, wherein a user corresponding to the second communication terminal is a friend user of a user corresponding to the first communication terminal.]

[12. The non-transitory computer-readable storage medium according to claim 9, wherein the second item is identical to the first item.]

[13. The non-transitory computer-readable storage medium according to claim 9, wherein the first item and the second item restore an energy, an attack cost and a defense cost.]

[14. The non-transitory computer-readable storage medium according to claim 9, wherein the notification that the first item is provided is sent to additional communication terminals of the plurality of communication terminals corresponding to a plurality of the additional user ID information, and when receiving additional requests for the first item from a predetermined number of the additional communication terminals, the second item is provided to the first communication terminal.]

[15. The non-transitory computer-readable storage medium according to claim 9, wherein when the notification is sent to a predetermined number of the plurality of communication terminals, the second item is provided to the plurality of communication terminals corresponding to a plurality of user ID information associated with the notification.]

[16. The non-transitory computer-readable storage medium according to claim 9, further comprising generating a selection panel that allows for selection of, among a plurality of different user ID information linked to the first user ID information, a destination of the notification that the first item is provided to the first communication terminal.]

[17. A game control method for providing a plurality of items usable in a game to a plurality of communication terminals connected to the game over a network, the game control method comprising:

an item providing step of, when receiving a request for provision of a first item usable in the game from a first communication terminal of the plurality of communication terminals corresponding to first user ID information, providing the first item to the first communication terminal; and a notification step of, when providing the first item to the first communication terminal, sending a notification to a second communication terminal of the plurality of communication terminals that the first item is provided to the first communication terminal, the second communication terminal corresponding to second user ID information linked to the first user ID information, wherein when receiving a request for provision of the first item from the second communication terminal based on the notification, a notification is sent to a third communication terminal of the plurality of communication terminals that the first item is provided to the second communication terminal, the third communication terminal corresponding to third user ID information linked to the second user ID information, wherein the first user ID information identifies a first user, the second user ID information identifies a second user different from the first user, and the third user ID information identifies a third user different from the first user and the second user, and wherein at the item providing step, a second item usable in the game, in addition to the first item, is provided to the second communication terminal that is mentioned in the notification sent to the third communication terminal by the notifier.]

[18. The game control method according to claim 17, wherein when receiving a request for provision of the first item from the third communication terminal based on the notification, the item provider provides the second item usable in the game to at least one of (i) the first communication terminal and (ii) the third communication terminal that sends a request for provision of the first item based on the notification.]

[19. The game control method according to claim 17, wherein a user corresponding to the second communication terminal is a friend user of a user corresponding to the first communication terminal.]

[20. The game control method according to claim 17, wherein the second item is identical to the first item.]

[21. The game control method according to claim 17, wherein the first item and the second item restore an energy, an attack cost and a defense cost.]

[22. The game control method according to claim 17, wherein the notification that the first item is provided is sent to additional communication terminals of the plurality of communication terminals corresponding to a plurality of the additional user ID information, and when receiving additional requests for the first item from a predetermined number of the additional communication terminals, the second item is provided to the first communication terminal.]

[23. The game control method according to claim 17, wherein when the notification is sent to a predetermined number of the plurality of communication terminals, the second item is provided to the plurality of communication terminals corresponding to a plurality of user ID information associated with the notification.]

[24. The game control method according to claim 17, further comprising generating a selection panel that allows for selection of, among a plurality of different user ID information linked to the first user ID information, a destination of the notification that the first item is provided to the first communication terminal.]

*25. A game server transmitting a plurality of items usable in a game to a plurality of communication terminals connected to the game server over a network in order to implement an affiliate system in the game, the game server comprising:*

*a network interface configured to communicate with the plurality of communication terminals over the network;*

*a memory storing user identification (ID) information corresponding to the plurality of communication terminals, and notification information including predetermined notification destinations and a notification destination history of each of the plurality of communication terminals; and*

*a processor operatively coupled to the memory and the network interface, the processor being programmed to:*

*receive a first request from a first communication terminal of the plurality of communication terminals to provide a first item usable in the game to the first communication terminal, the first communication terminal corresponding to first user ID information, the first user ID information identifying a first user;*

*generate a graphical user interface including a selection panel configured to allow selection of a destination of each one of a first notification and a second notification among a plurality of different user ID information linked to the first user ID information and second user ID information;*

*transmit instructions to at least one of the first communication terminal and a second communication terminal to display the generated graphical user interface including the selection panel;*

*receive the selection of the destination of the first notification;*

*in response to receiving the first request and the selection of the destination of the first notification from the first communication terminal, determine the second user ID information as the destination of the first notification, which is linked to the first user ID information in the stored user ID information based on the stored notification information, the second user ID information identifying a second user;*

*transmit the first item to the first communication terminal;*

*in response to transmitting the first item to the first communication terminal, transmit the first notification to the second communication terminal of the plurality of communication terminals corresponding to the determined second user ID information, the first notification indicating that the first item is provided to the first communication terminal;*

*receive a second request from the second communication terminal to provide the first item to the second communication terminal, the second request from the second communication terminal having been sent in response to the second communication terminal receiving the first notification;*

*receive the selection of the destination of the second notification from the second communication terminal;*

*in response to receiving the second request and the selection of the destination of the second notification from the second communication terminal, determine third user ID information as the destination of the second notification, which is linked to the second user ID information in the stored user ID information based on the stored notification information, the third user ID information identifying a third user;*

*transmit the second notification to a third communication terminal of the plurality of communication terminals corresponding to the determined third user ID information, the second notification indicating that the first item is provided to the second communication terminal; and*

*transmit a second item usable in the game, in addition to the first item, to both the first communication terminal and the second communication terminal, such that the first and second communication terminals are automatically rewarded with the second item based on the second notification to the third communication terminal.*

*26. The game server according to claim 25, wherein the processor is programmed to:*

*in response to receiving a third request to provide the first item from the third communication terminal, transmit a third item usable in the game to at least one of the first communication terminal and the second communication terminal, in addition to transmitting the first item to the third communication terminal.*

*27. The game server according to claim 25, wherein the second item is identical to the first item.*

*28. The game server according to claim 25, wherein the processor is programmed to:*

*transmit the first notification to at least one additional destination corresponding to an additional communication terminal of the plurality of communication terminals; and*

*in response to receiving a predetermined number of requests for the first item from the plurality of communication terminals, transmit the second item to the first communication terminal again.*

*29. The game server according to claim 25, wherein the second item is transmitted to both the first communication terminal and the second communication terminal contemporaneously with transmitting the second notification to the third communication terminal.*

*30. A non-transitory computer-readable storage medium storing instructions to be executed by a computer for functioning as a game server that transmits a plurality of items usable in a game to a plurality of communication terminals connected to the game server over a network in order to implement an affiliate system in the game, the instructions including a program causing the computer to execute:*

*a first receiving step of receiving a first request from a first communication terminal of the plurality of communication terminals to provide a first item usable in the game to the first communication terminal, the first communication terminal corresponding to first user identification (ID) information, the first user ID information identifying a first user;*

*a destination setting step of:*

*generating a graphical user interface including a selection panel configured to allow selection of a destination of each one of a first notification and a second notification among a plurality of different user ID information linked to the first user ID information and second user ID information,*

*transmitting instructions to at least one of the first communication terminal and a second communication terminal to display the generated graphical user interface including the selection panel, and*

*receiving the selection of the destination of the first notification;*

*a first item providing step of, in response to receiving the first request and the selection of the destination of the first notification from the first communication terminal, (i) determining the second user ID information as the destination of the first notification, which is linked to the first user ID information based on notification information, the notification information including predetermined notification destinations and a notification destination history of each of the plurality of communication terminals, and (ii) transmitting the first item to the first communication terminal, the second user ID information identifying a second user;*

*a notification step of, in response to transmitting the first item to the first communication terminal, transmitting the first notification to the second communication terminal of the plurality of communication terminals corresponding to the determined second user ID information, the first notification indicating that the first item is provided to the first communication terminal;*

*a second receiving step of (1) receiving a second request from the second communication terminal to provide the first item to the second communication terminal, the second request from the second communication terminal having been sent in response to the second communication terminal receiving the first notification, and (2) receiving the selection of the destination of the second notification from the second communication terminal;*

*a determining step of, in response to receiving the second request and the selection of the destination of the second notification from the second communication terminal, determining third user ID information as the destination of the second notification, which is linked to the second user ID information based on the notification information;*

*a transmitting step of transmitting the second notification to a third communication terminal of the plurality of communication terminals corresponding to the determined third user ID information, the second notification indicating that the first item is provided to the second communication terminal, the third user ID information identifying a third user; and*

*a second item providing step of transmitting a second item usable in the game, in addition to the first item, to both the first communication terminal and the second communication terminal, such that the first and second communication terminals are automatically rewarded with the second item based on the second notification to the third communication terminal.*

*31. The non-transitory computer-readable storage medium according to claim 30, wherein:*

*in the second item providing step, in response to receiving a third request to provide the first item from the third communication terminal, transmit a third item usable in the game to at least one of the first communication terminal and the second communication terminal, in addition to transmitting the first item to the third communication terminal.*

*32. The non-transitory computer-readable storage medium according to claim 31, wherein the second item is identical to the first item.*

*33. The non-transitory computer-readable storage medium according to claim 31, wherein in the notification step:*

*transmit the first notification to at least one additional destination corresponding to an additional communication terminal of the plurality of communication terminals; and*

*in response to receiving a predetermined number of requests for the first item from the plurality of communication terminals, transmit the second item to the first communication terminal again.*

*34. The non-transitory computer-readable storage medium according to claim 30, wherein, in the second item providing step, the second item is transmitted to both the first communication terminal and the second communication terminal contemporaneously with transmitting the second notification to the third communication terminal.*

*35. A game control method providing a plurality of items usable in a game to a plurality of communication terminals*

*connected to the game over a network in order to implement an affiliate system in the game, the game control method comprising:*

*a first receiving step of receiving a first request from a first communication terminal of the plurality of communication terminals to provide a first item usable in the game to the first communication terminal, the first communication terminal corresponding to first user identification (ID) information, the first user ID information identifying a first user;*

*a destination setting step of:*

*generating a graphical user interface including a selection panel configured to allow selection of a destination of each one of a first notification and a second notification among a plurality of different user ID information linked to the first user ID information and second user ID information,*

*transmitting instructions to at least one of the first communication terminal and a second communication terminal to display the generated graphical user interface including the selection panel, and*

*receiving the selection of the destination of the first notification;*

*a first item providing step of, in response to receiving the first request and the selection of the destination of the first notification from the first communication terminal, (i) determining the second user ID information as the destination of the first notification, which is linked to the first user ID information based on notification information, the notification information including predetermined notification destinations and a notification destination history of each of the plurality of communication terminals, and (ii) transmitting the first item to the first communication terminal, the second user ID information identifying a second user;*

*a notification step of, in response to transmitting the first item to the first communication terminal, transmitting the first notification to the second communication terminal of the plurality of communication terminals corresponding to the determined second user ID information, the first notification indicating that the first item is provided to the first communication terminal;*

*a second receiving step of (1) receiving a second request from the second communication terminal to provide the first item to the second communication terminal, the second request from the second communication terminal having been sent in response to the second communication terminal receiving the first notification, and (2) receiving the selection of the destination of a second notification from the second communication terminal;*

*a determining step of, in response to receiving the second request and the selection of the destination of the second notification from the second communication terminal, determining third user ID information as the destination of the second notification, which is linked to the second user ID information based on the notification information;*

*a transmitting step of transmitting the second notification to a third communication terminal of the plurality of communication terminals corresponding to the determined third user ID information, the second notification indicating that the first item is provided to the second communication terminal, the third user ID information identifying a third user; and*

*a second item providing step of transmitting a second item usable in the game, in addition to the first item, to both the first communication terminal and the second communication terminal, such that the first and second communication terminals are automatically rewarded with the second item based on the second notification to the third communication terminal.*

*36. The game control method according to claim 35, wherein:*

*in the second item providing step, in response to receiving a third request to provide the first item from the third communication terminal, transmit a third item usable in the game to at least one of the first communication terminal and the second communication terminal, in addition to transmitting the first item to the third communication terminal.*

*37. The game control method according to claim 35, wherein the second item is identical to the first item.*

*38. The game control method according to claim 35, wherein in the notification step:*

*transmit the first notification to at least one additional destination corresponding to an additional communication terminal of the plurality of communication terminals; and*

*in response to receiving a predetermined number of requests for the first item from the plurality of communication terminals, transmit the second item to the first communication terminal again.*

*39. The game control method according to claim 35, wherein, in the second item providing step, the second item is transmitted to both the first communication terminal and the second communication terminal contemporaneously with transmitting the second notification to the third communication terminal.*

* * * * *